3,031,456
N-PHENETHYL-PIPERIDYL-4-α-ETHYL-ISOVALERATES

Roman P. Holysz, Kalamazoo, Mich., assignor to The Upjohn Company, Kalamazoo, Mich., a corporation of Delaware
No Drawing. Filed Oct. 22, 1959, Ser. No. 847,881
4 Claims. (Cl. 260—294.3)

This invention pertains to novel organic compounds, and is particularly directed to novel α-ethylisovalerate esters of 1-phenethyl-4-piperidinols in the form of their free bases and acid addition salts.

The compounds of the invention, in the form of their free bases, are represented by the following general structural formula:

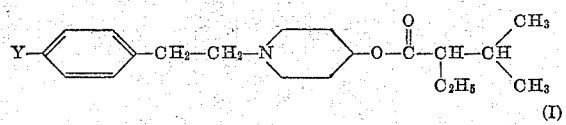

(I)

wherein Y is selected from the group consisting of hydrogen, halogen having an atomic weight between 35 and 127, i.e., chlorine, bromine, and iodine, R and RO wherein R is lower-alkyl, for example, methyl, ethyl, isopropyl, butyl, sec-butyl, amyl, isoamyl, hexyl, and like lower-alkyl radicals.

The novel compounds of the invention are toxic to fungi, especially plant pathogenic fungi, and can be used to control the propagation of fungi and hence, to prevent or eradicate fungal diseases of plants. They are effective, for example, against bean anthracnose (*Colletotrichum lindemuthianum*); they are also effective against bean rust (*Uromyces phaseoli*), early blight of tomatoes (*Alternaria solani*), and powdery mildew of cucumbers (*Erysiphe cichoracearum*). The compounds of the invention also possess analgetic activity. Further, the compounds of the invention are useful, in accordance with U.S. Patents 1,915,334 and 2,075,359, in forming amine fluosilicate mothproofing agents and, in accordance with U.S. Patents 2,425,320 and 2,606,155, in forming amine thiocyanate-formaldehyde condensation products for use as pickling inhibitors.

The fungicidally active 1-phenethyl-4-piperidyl α-ethyl-isovalerates of this invention can be used in their pure state, but for practical reasons it is preferred that they be used as fungicidal compositions. The compounds can be conveniently formulated as fungicidal compositions with a diluent carrier and with or without adjuvants.

For example, fungicidal compositions useful against phytopathogenic fungi can be formulated with aqueous or nonaqueous carriers for application to foliage, seeds, or other parts of plants. Compositions suitable for root or bole infusion can be made. Moreover, the active agents of the invention can be used alone in compositions, or they can be used in combination with other fungicidal, virucidal, insecticidal, bactericidal or acaricidal agents.

It is usually desirably, particularly in the case of foliar spray formulation, to include adjuvants such as wetting agents, spreading agents, dispersing agents, stickers and adhesives, and the like, in accordance with usual agricultural practices. Any of the conventional wetting and dispersing agents of the anionic, cationic, and nonionic types that are commonly employed in compositions for application to plants can be used. Surfactants having sufficient wetting activity and therefore suitable for the compositions of this invention include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl quaternary ammonium salts, sulfated fatty acid esters, sulfated fatty acid amides, glycerol mannitan laurate, polyalkylether condensates of fatty acids, lignin sulfonates, and the like. It will be understood, of course, that the sulfate and sulfonate compounds suggested above will be used in the form of their soluble salts, e.g., sodium salts. All of these surfactants are capable of reducing the surface tension of water to less than about 40 dynes per centimeter in concentrations of about 1% or less.

Carriers suitable for diluting the active agents of the invention include water, water containing a surfactant, or an inert dusting powder, illustratively, talc, pyrophyllite, diatomite, clays such as bentonite, Georgia clay and Attapulgus clay, wood or walnut shell flour, and the like. The term "dusting powder" as used herein will be understood to refer to a solid material comminuted to an average particle size less than 50 microns, advantageously, less than 15 microns.

For convenience in handling, the active compounds of the invention can be prepared in the form of concentrated solutions in a water-miscible solvent, for example, dimethylformamide, dimethylacetamide, dimethyl sulfoxide, acetonitrile, cyclohexanone, or similar solvent. Such concentrated solutions can be admixed with a suitable volume of an aqueous medium to give a mixture of any desired concentration. For the most part, mixtures containing very low concentrations of the active ingredient are effective. Illustratively, the concentration of the 1-phenethyl-4-piperidyl α-ethylisovalerate can range from about 50 to 5000 p.p.m., depending upon the amount of active material applied per acre. For example, excellent control of powdery mildew on cucumbers, both protective and eradicative, has been obtained using concentrations of active ingredient ranging from 125 to 2000 p.p.m. and without damage to the plants. For example, a concentrate comprising 5% (by weight) of the compound dissolved in a water-miscible solvent of the kind noted above can be admixed with an aqueous medium in the proportions of one teaspoonful (about 5 cc.) of concentrate with one gallon of medium to give a mixture containing 60 to 75 parts of active ingredient per million parts of water. Similarly, one pint of a 5% concentrate mixed with 100 gals. of water provides about 60 p.p.m. of active ingredient. In the same manner, more concentrated solutions of active ingredient in a water-miscible solvent can be incorporated with an appropriate quantity of aqueous medium to give a mixture of desired concentration.

It will of course be appreciated that the conditions encountered when applying the method and compositions of this invention to actual practice can vary widely. Included among the variables that may be encountered are the degree of infestation by pathogens, the particular plant being treated, the degree of development of the plant, the prevailing weather conditions, such as temperature, relative humidity, rainfall, dews, and so forth.

A suitable formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

|  | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at one pound per 100 gals., gives a spray formulation containing about 0.03% (300 p.p.m.) active ingredient.

Another suitable formulation is obtained by mixing approximately equal parts of the active ingredient and pyrophyllite, comminuting either before or after the admixture as desired, to produce a dusting powder, and dispersing the resulting product in an aqueous vehicle with the aid of a surfactant. Suitable surfactants include sodium lauryl sulfate, sodium and calcium lignosulfonates, 1-tetradecyl-4-methylpyridinium chloride, Triton X–100 and Pluronic–F68 (ethylene oxide-propylene glycol condensate, nonionic surfactant). If desired the surfactant can be incorporated in the dry mixture either by dry milling or by adding it in solution in a volatile solvent such as ethanol or acetone, mixing to form a paste, drying, and milling.

The α-ethylisovalerate esters of the invention are readily obtained by esterifying a 1-phenethyl-4-piperidinol having the following general structural formula:

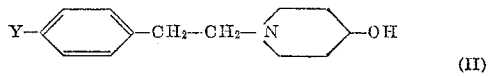

(II)

wherein Y is as defined above, with α-ethylisovaleryl halide, for example, α-ethylisovaleryl chloride, to produce a 1-phenethyl-4-piperidyl α-ethylisovalerate having the formula I.

Advantageously, the piperidinol compound and α-ethylisovaleryl halide are reacted in the presence of an inert solvent, illustratively ether, tetrahydrofuran, dioxane, toluene, xylene, benzene, and the like, and an acid acceptor, illustratively pyridine, lutidine, picoline, triethylamine, and the like. If desired, the acid acceptor can also serve as the inert solvent merely by employing a sufficient quantity of the same, without including an additional inert solvent of the kind illustrated. The reactants can be employed in stoichiometric proportions, i.e., equimolar proportions, or an excess of either reactant can be employed if so desired. Ordinarily, however, it is preferred to employ the α-ethylisovaleryl halide in an amount which is at least equimolar with respect to the piperidinol compound, particularly when an acid acceptor is included in the reaction mixture. The reaction proceeds satisfactorily at temperatures ranging from about −25° to about 100° C., particularly from about 0° to about 75° C. After the reaction has been completed, the resulting 1-phenethyl-4-piperidyl α-ethylisovalerate (formula I, above) can be isolated in free base form in conventional manner, for example, by basifying the reaction mixture, illustratively with an aqueous solution of sodium hydroxide, extracting the basic mixture with a solvent, illustratively ether, separating the layers, and evaporating the organic layer.

The acid addition salts of the free bases (formula I above) are obtained by neutralizing the free bases with acids, illustratively, hydrochloric, hydrobromic, sulfuric, phosphoric, sulfamic, acetic, lactic, tartaric, gluconic, citric, benzoic, salicylic, and like acids. For example, the free base is dissolved in a solvent, illustratively, ethanol, and the desired acid is added. The solvent is then evaporated, and the acid addition salt formed by neutralization of the free base is then purified, if so desired, using conventional procedures such as recrystallization, etc.

The following examples are illustrative of the process and products of the present invention, but are not to be construed as limiting.

PREPARATION 1

*Preparation of 1-Phenethyl-4-Piperidinol*

A solution consisting of 101.2 g. (1 mole) of 4-piperidinol and 127.0 g. (1.20 moles) of sodium carbonate dissolved in 600 ml. of water was heated to 60° C. in a 2-liter flask equipped with a thermometer, stirrer, dropping funnel, and condenser. During an interval of 3.5 hours, while maintaining the temperature of the reaction mixture between 50° and 60° C., a solution of 185.1 g. (1 mole) of phenethyl bromide in 500 ml. of ethanol was added. The reaction mixture was refluxed for 4 hours with stirring, and allowed to stand overnight at about 25° C. The mixture was then distilled (using a simple distilling head) until the head temperature reached 95° C., and it was then cooled to about 25° C. The mixture thus stripped of ethanol was then extracted with five 200-ml. portions of methylene chloride, and the combined methylene chloride extracts were washed with two 100-ml. portions of saturated sodium chloride solution. The washed methylene chloride solution was then dried overnight with 50 g. of anhydrous sodium sulfate. The solution was filtered, and concentrated to dryness under reduced pressure. The last traces of solvent were removed by heating the residue at about 95° C. at about 40 mm. mercury pressure for 20 minutes. The warm oily residue thus obtained was triturated with 250-ml. portions of technical hexane (Skellysolve B). The triturated residue was dissolved in 100 ml. of absolute ethanol and the solution was warmed to 35° C.; 200 ml. of USP ether was then added while swirling the solution gently. The ether-ethanol solution was cooled slowly and refrigerated at about −15° C. for 3 days, in order to induce crystallization. The crystals were recovered on a filter, the filter cake was washed with 50 ml. of cold ether, and the crystals of 1-phenethyl-4-piperidinol were dried to constant weight in an oven at 50° C. under reduced pressure; dry weight, 124.2 g., melting point, 95.5–98.5° C.

Following the procedure described above but substituting for phenethyl bromide the following: p-chlorophenethyl bromide, p-ethylphenethyl bromide, and p-methoxyphenethyl bromide; 1-(p-chlorophenethyl)-4-piperidinol, 1-(p-ethylphenethyl)-4-piperidinol, and 1-(p-methoxyphenethyl)-4-piperidinol, respectively, were prepared.

PREPARATION 2

*Preparation of α-Ethylisovaleryl Chloride*

A mixture of 6.16 g. (47 millimoles) of α-ethylisovaleric acid having a boiling point of 98 to 103° C. at 15 mm. of mercury pressure and refractive index, $n_D^{25}$, of 1.4180, and 11.0 ml. of thionyl chloride was heated at reflux temperature for 2.5 hours. The reaction mixture was then distilled under reduced pressure in order to remove volatile components. The α-ethylisovaleryl chloride was recovered as a liquid having a boiling point of 80 to 81.5° C. at 75 mm. of mercury pressure, a refractive index, $n_D^{25}$, of 1.4276, and density, $d_4^{25}$, of 0.957.

EXAMPLE 1

*Preparation of 1-Phenethyl-4-Piperidyl α-Ethylisovalerate and the Hydrochloride Thereof*

A solution consisting of 4.46 g. (0.03 mole) of α-ethylisovaleryl chloride in 15 ml. of toluene was added dropwise during an interval of one hour to a stirring solution of 4.10 g. (0.02 mole) of 1-phenethyl-4-piperidinol in 25 ml. of dry pyridine and 10 ml. of toluene at 0.5° C. The reaction mixture was stirred overnight at room temperature. It was then heated on a steam bath for 15 minutes, cooled to 5° C., and shaken with 50 ml. of ice-cold 5% aqueous sodium hydroxide solution and 50 ml. of ether. After phase separation, the aqueous layer was separated from the organic layer and extracted with two 50-ml. portions of ether. The ether extracts were combined with the organic layer and the whole was washed with four 25-ml. portions of water. The organic solvents were then evaporated, leaving 1-phenethyl-4-piperidyl α-ethylisovalerate as a red-brown oil.

The oil was dissolved in 25 ml. of absolute ethanol and 1.5 ml. of concentrated hydrochloric acid was added. The solution was concentrated to dryness, and the residue was triturated with several 25-ml. portions of ether. The 1-phenethyl-4-piperidyl α-ethylisovalerate hydrochloride thus obtained, after two recrystallizations from water, melted at 264° to 265° C.

*Analysis.*—Calculated for $C_{20}H_{32}ClNO_2$: C, 67.87; H, 9.11; Cl, 10.02; N, 3.96. Found: C, 67.45; H, 9.11; Cl, 10.16; N, 3.92.

Following the procedure as described above but substituting hydrobromic, sulfuric, phosphoric, sulfamic, acetic, lactic, tartaric, gluconic, citric, benzoic, and salicylic acid for hydrochloric acid, 1-phenethyl-4-piperidyl α-ethylisovalerate hydrobromide, sulfate, phosphate, sulfamate, acetate, lactate, tartrate, gluconate, citrate, benzoate, and salicylate, respectively, were prepared.

EXAMPLE 2

*Preparation of 1-(p-Ethylphenethyl)-4-Piperidyl α-Ethylisovalerate and the Hydrochloride Thereof*

Following the procedure of Example 1, but substituting 1-(p-ethylphenethyl)-4-piperidinol for 1-phenethyl-4-piperidinol, 1-(p-ethylphenethyl)-4-piperidyl α-ethylisovalerate and the hydrochloride thereof were prepared.

EXAMPLE 3

*Preparation of 1-(p-Methoxyphenethyl)-4-Piperidyl α-Ethylisovalerate and the Hydrochloride Thereof*

Following the procedure of Example 1, but substituting 1-(p-methoxyphenethyl)-4-piperidinol for 1-phenethyl-4-piperidinol, 1-(p-methoxyphenethyl)-4-piperidyl α-ethylisovalerate and the hydrochloride thereof were prepared.

EXAMPLE 4

*Preparation of 1-(p-Chlorophenethyl)-4-Piperidyl α-Ethylisovalerate and the Hydrochloride Thereof*

Following the procedure of Example 1, but substituting 1-(p-chlorophenethyl)-4-piperidinol for 1-phenethyl-4-piperidinol, 1-(p-chlorophenethyl)-4-piperidyl α-ethylisovalerate and the hydrochloride thereof were prepared.

I claim:

1. A compound selected from the group consisting of: (1) compounds represented by the following structural formula

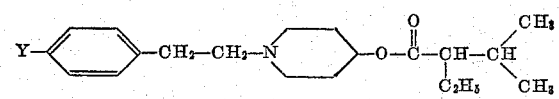

wherein Y is selected from the group consisting of hydrogen, halogen having an atomic weight between 35 and 127, R and RO wherein R is a lower-alkyl radical; and (2) acid addition salts thereof.

2. 1-phenethyl-4-piperidyl α-ethylisovalerate.

3. 1-phenethyl-4-piperidyl α-ethylisovalerate hydrochloride.

4. 1-phenethyl-4-piperidyl α-ethylisovalerate acid addition salt.

References Cited in the file of this patent

UNITED STATES PATENTS

| | | |
|---|---|---|
| 1,962,109 | Alvord | June 5, 1934 |
| 2,177,198 | Goldsworthy | Oct. 24, 1939 |
| 2,746,966 | Biel | May 22, 1956 |
| 2,816,895 | Ehrhart et al. | Dec. 17, 1957 |
| 2,918,406 | Biel | Dec. 22, 1959 |
| 2,918,407 | Biel | Dec. 22, 1959 |
| 2,918,408 | Biel | Dec. 22, 1959 |

OTHER REFERENCES

Amin et al.: "J. Am. Pharm. Asso.," Scientific edition, vol. 37, pages 243–245 (1948).

Loening et al.: "J. Am. Chem. Soc.," vol. 74, pages 3929–3931 (1952).